United States Patent [19]

Komiya et al.

[11] Patent Number: 5,242,227
[45] Date of Patent: Sep. 7, 1993

[54] MULTI-SLIDER SINGLE RAIL LINEAR MOTION GUIDE UNIT

[75] Inventors: Yoshiyuki Komiya, Kawasaki; Hiroshi Ueki, Ebina, both of Japan

[73] Assignee: Nippon Thompson Co., Ltd.

[21] Appl. No.: 883,499

[22] Filed: May 15, 1992

[30] Foreign Application Priority Data

May 22, 1991 [JP] Japan .................... 3-146743

[51] Int. Cl.$^5$ ............................ F16C 29/06
[52] U.S. Cl. ........................ 384/45; 384/49; 384/53
[58] Field of Search ............. 384/18, 19, 43–45, 384/49, 53

[56] References Cited

U.S. PATENT DOCUMENTS

| | | | |
|---|---|---|---|
| 640,397 | 1/1900 | Merker | 384/44 X |
| 2,812,222 | 11/1957 | Gussack | 384/49 |
| 3,005,665 | 10/1961 | Thomson et al. | 384/43 |
| 4,118,101 | 10/1978 | Teramachi | 384/45 |
| 4,348,063 | 9/1982 | Chambers | 384/45 X |
| 4,598,956 | 7/1986 | Teramachi | 384/45 |

*Primary Examiner*—Thomas R. Hannon
*Attorney, Agent, or Firm*—Skjerven, Morrill, MacPherson, Franklin & Friel

[57] ABSTRACT

A multi-slider single rail linear motion rolling contact guide unit is provided. The guide unit includes an elongated rail provided with a first pair of guide grooves and a second pair of guide grooves. A first slider is provided with a first pair of endless circulating paths filled with a plurality of rolling members engageable with the first pair of guide grooves, and, similarly, a second slider is provided with a second pair of endless circulating paths filled with a plurality of rolling members engageable with the second pair of guide grooves. Thus, the first and second sliders are slidably mounted on the rail independently from each other.

7 Claims, 1 Drawing Sheet

MULTI-SLIDER SINGLE RAIL LINEAR MOTION GUIDE UNIT

BACKGROUND OF THE INVENTION

1. Field of the Invention

This invention generally relates to a linear motion rolling contact guide unit, and, in particular, to such a guide unit having a plurality of sliders.

2. Description of the Prior Art

A linear motion rolling contact guide unit is well known in the art and it generally includes a rail extending over a desired length, a slider slidably mounted on the rail and a plurality of rolling members, such as balls or rollers, interposed between the rail and the slider to thereby provide a rolling contact therebetween. Typically, a rail is elongated in shape and has a pair of opposite sides, each of which is formed with an inner guide groove extending in parallel with the longitudinal axis of the rail. The slider is generally U-shaped in cross section, including a horizontal section and a pair of vertical sections depending from the opposite sides of the horizontal section, and mounted on the rail upside down in a straddling manner. An outer guide groove is formed on each of the vertical sections in an opposed relation with a corresponding one of the inner guide grooves to thereby define a guide channel therebetween. The slider is typically provided with a pair of endless circulating paths, each including a load path section, which corresponds to the guide channel, a return path section and a pair of curved connecting path sections, each connecting the corresponding ends of the load and return path sections. A plurality of rolling members are provided in each of the endless circulating paths.

As described above, the guide rail typically includes only one slider slidably mounted on a rail. And, therefore, if it is desired to provide two such sliders, two rails or two whole guide units must be provided.

SUMMARY OF THE INVENTION

In accordance with the present invention, there is provided a linear motion guide unit including an elongated rail having first and second guiding means separate from each other, at least one first slider slidably mounted on said rail in engagement with the first guiding means, at least one second slider slidably mounted on said rail in engagement with the second guiding means, a plurality of first rolling members interposed between the rail and the first slider engageably with the first guiding means and a plurality of second rolling members interposed between the rail and the second slider engageably with the second guiding means.

Preferably, each of the first and second sliders is provided with a pair of endless circulating paths, each including a load path section, a return path section, and a pair of curved connecting path sections connecting the corresponding ends of the load and return path sections. In a preferred embodiment, the first and second guiding means includes a pair of first and second guide grooves, respectively, extending in parallel with the longitudinal axis of the rail. The first and second sliders preferably include a pair of third and fourth guide grooves, respectively, and each of the third guide grooves is associated with a corresponding one of the pair of first guide grooves and each of the fourth guide grooves is associated with a corresponding one of the pair of second guide grooves.

In one embodiment, the rail has a generally U-shaped cross section, including a horizontal section and a pair of vertical sections depending from the opposite sides of the horizontal section. The first guide grooves are formed in the opposite outer side surfaces of rail and the second guide grooves are formed in the opposite inner side surfaces of the rail. In this embodiment, the first slider also has a generally U-shaped cross section, including a horizontal section and a pair of vertical sections depending from the opposite sides of the horizontal section, and is slidably mounted on the rail in a straddling manner. Thus, the third guide grooves associated with the respective first guide grooves are formed in the inner side surfaces of the vertical sections of the first slider. The first rolling members are interposed between the first slider and the rail.

On the other hand, the second guide grooves are formed in the inner opposite side surfaces of the vertical sections of the rail. The fourth guide grooves are formed in the opposite outer side surfaces of the second slider in an opposed relationship with the respective second guide grooves of the rail. The second slider thus may have a generally rectangular cross section to be substantially received in the space defined by the U-shaped cross section of the rail. Preferably, the second slider is also provided with a pair of endless circulating paths, each provided with a plurality of second rolling members, and, thus, the second rolling members may provide a rolling contact between the rail and the second slider.

As described above, since the rail is provided with separate first and second guiding means for separately mounting the first and second sliders on the rail, the first and second sliders may move linearly relative to the rail independently from each other. In the preferred embodiment, since the first and second sliders move on the opposite sides, or top and bottom, of the rail, the rail is preferably so structured that a mounting section is defined at each end portion thereof. In this case, the rail is maintained in position in a bridge-like manner, and the first and second sliders may move linearly back and forth independently from each other.

It is therefore a primary object of the present invention to provide an improved linear motion guide unit.

Another object of the present invention is to provide a linear motion rolling contact guide unit including a plurality of sliders linearly movable along separate motion paths defined along a single rail.

A further object of the present invention is to provide a multi-slider linear motion rolling contact guide unit which can provide an increased scope of applications and yet which is compact in size.

Other objects, advantages and novel features of the present invention will become apparent from the following detailed description of the invention when considered in conjunction with the accompanying drawings.

DESCRIPTION OF THE PREFERRED EMBODIMENTS

Figure 1:
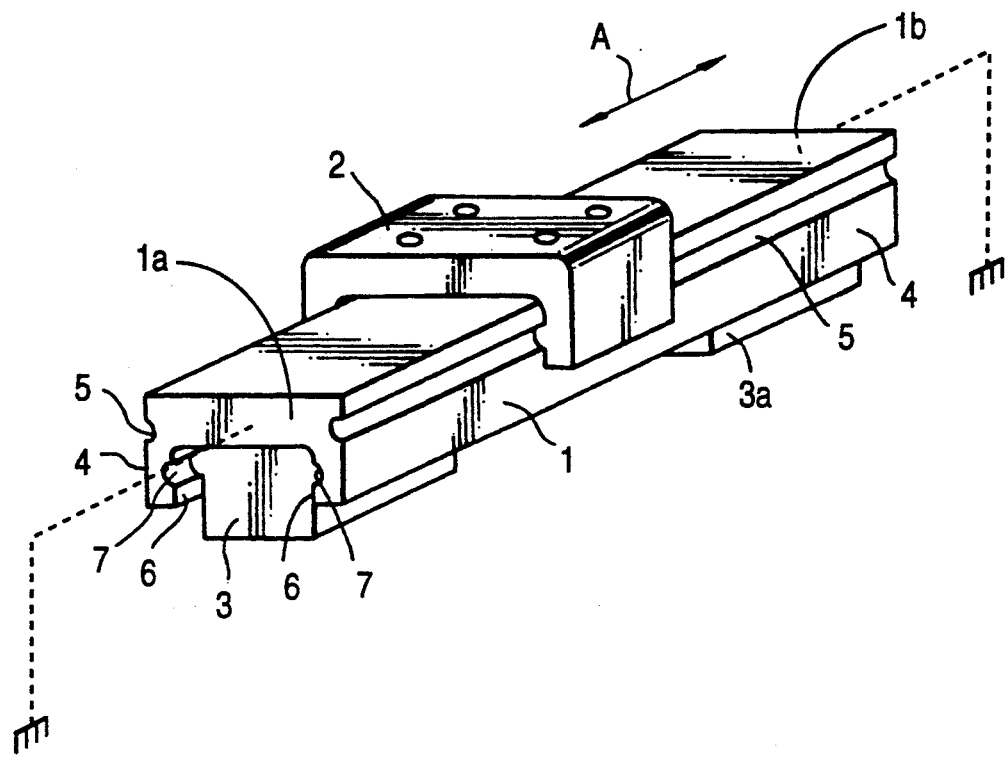
FIG. 1 is a schematic illustration showing in perspective view a multi-slider single rail linear motion guide unit constructed in accordance with one embodiment of the present invention.
Figure 2:
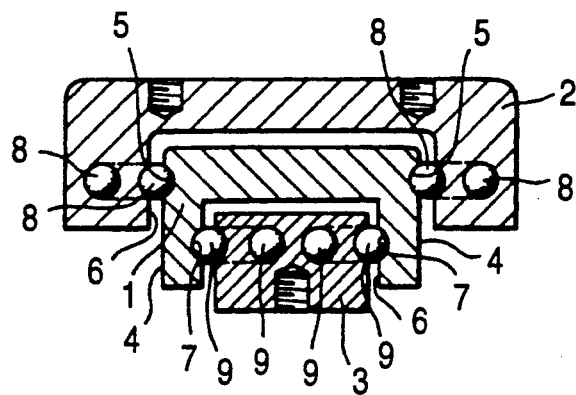
FIG. 2 is a schematic illustration showing in transverse cross section the linear motion guide unit shown in FIG. 1.

Referring now to FIG. 1, there is schematically shown a multi-slider single rail linear motion rolling contact guide unit constructed in accordance with one embodiment of the present invention. As shown, the present linear motion guide unit generally includes an elongated rail 1, an upper slider 2 and a lower slider 3. As best shown in FIG. 2, the rail 1 has a generally U-shaped cross section, including a horizontal section and a pair of vertical sections depending from the opposite sides of the horizontal section. While shown schematically, the rail 1 is provided with a mounting section 1a and 1b at each end thereof, so that the rail 1 may be set in position in the air in a bridge-like manner. In the illustrated embodiment, the rail 1 has an outer side surface 4 which is formed with a guide groove 5, which has a circular cross section in this embodiment, extending straight in parallel with the longitudinal axis of the rail 1 and also an inner side surface 6 which is formed with a guide groove 7, which has a circular cross section in this embodiment, also extending straight in parallel with the longitudinal axis of the rail 1.

The upper slider 2 also has a generally U-shaped cross section, including a horizontal section and a pair of vertical sections depending from the opposite sides of the horizontal section. The upper slider 2 is provided with a pair of first endless circulating paths, each including a load path section, a return path section and a pair of curved connecting path sections each connecting the corresponding ends of the load and return path sections, as well known in the art. The inner side surface of each of the vertical sections of the upper slider 2 is formed with a guide groove which has a circular cross section in this embodiment and which is associated with a corresponding guide groove 5 of the rail 1 to thereby define a corresponding load path section of its associated first endless circulating path.

Each of the first endless circulating paths is provided with a plurality of rolling members 8 or balls in the illustrated embodiment, so that those balls 8 which are located in the load path sections provide a rolling contact between the rail 1 and the upper slider 2. Thus, the upper slider 2 may move linearly relative to the rail 1 as long as the rail 1 extends in either direction, as indicated by a double directed arrow A. The upper slider 2 is also provided with a plurality of mounting threaded holes at its top surface so that any desired object may be fixedly attached to the upper slider 2 using such mounting holes.

In the illustrated embodiment, the lower slider 3 is generally rectangular in cross section and thus it has a pair of opposite side surfaces facing opposite to the associated respective inner side surfaces of the vertical sections of the rail 1. The lower slider 3 is also provided with a pair of second endless circulating paths, each including a load path section, a return path section and a pair of curved connecting path sections each connecting the corresponding ends of the load and return path sections. Each of the load path sections is defined by the guide groove 7 formed in the inner side surface of the rail 1 and its associated guide groove formed in a side surface of the lower slider 3 opposed to the inner side surface of the rail 1.

Each of the pair of endless circulating paths of the lower slider 3 is also provided with a plurality of rolling members 9 or balls in the illustrated embodiment, so that a rolling contact is provided between the rail 1 and the lower slider 3 by those balls 9 which are located in the load path sections. As a result, the lower slider 3 may also move relative to the rail 1 linearly along the rail 1 as long as the rail 1 extends. Since one or more mounting threaded holes are provided in the bottom surface of the lower slider 3, any desired object can be fixedly attached to the lower slider 3.

In the illustrated embodiment, in addition to the lower slider 3, another lower slider 3a identical in structure with the lower slider 3 is provided. It should be noted that another one or more lower sliders may also be provided, if desired. In addition, although only one upper slider 2 is provided in the illustrated embodiment, two or more upper sliders may also be provided, if desired. Moreover, use has been made of balls as the rolling members in the illustrated embodiment, use may also be made of rollers or any other rolling members similar in function to balls and rollers. Besides, although the so-called infinite stroke type sliders are employed in the illustrated embodiment due to the provision of endless circulating paths, use may also be made of the so-called finite stroke type sliders for either one or both of the upper and lower sliders.

In the preferred embodiment described above, the rail 1 has a generally U-shaped cross section. However, the rail 1 may have any desired cross sectional shape depending on desired applications. For example, the rail 1 may have a generally rectangular cross section, in which case the rectangular rail 1 may be formed with an additional pair of guide grooves at its opposite side surface and the lower slider 3 may have a structure similar to that of the upper slider 2, but turned upside down. Alternatively, the rail 1 may have a generally H-shaped cross sectional shape and each of the upper and lower sliders 2 and 3 may have either a rectangular or U-shaped cross sectional shape.

As described above, in accordance with the present invention, two separate motion paths are defined along a single rail and two separate sliders are provided to move linearly along the respective motion paths independently from each other. Therefore, the present guide unit may be used in various applications. For example, a work piece to be processed may be fixedly attached to either one of the two sliders temporarily and a cutting tool may be fixedly attached to the other slider temporarily. Under the condition, these two sliders may be moved relative to each other so as to process the work piece by means of the cutting tools to a desired shape. In this case, since the two motion paths are well defined in parallel, the processing can be carried out at high accuracy.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion guide unit, comprising:
   an elongated rail, including first guiding means extending in parallel with a longitudinal axis of said rail to thereby define a first path of motion and second guiding means extending in parallel with the longitudinal axis of said rail to thereby define a second path of motion separate from said first path of motion;

at least one first slider slidably mounted on said rail to travel along said first path, said first slider including third guiding means associated with said first guiding means to thereby define a first guide channel;

a plurality of first rolling members provided in said first guide channel to thereby provide a rolling contact between said rail and said first slider;

at least one second slider slidably mounted on said rail to travel along said second path, said second slider including fourth guiding means associated with said second guiding means to thereby define a second guide channel;

a plurality of second rolling members provided in said second guide channel to thereby provide a rolling contact between said rail and said second slider;

wherein at least one of said first and second sliders includes at least one endless circulating path which includes a load path section, a return path section and a pair of curved connecting path sections, each connecting corresponding ends of said load and return path sections, such that said load path section corresponds to a corresponding one of said guide channels; and wherein said rail is provided with a mounting portion at each end thereof, so that said rail extends in the air in a bridge-like fashion when set in position.

2. The guide unit of claim 1, wherein said first and second rolling members are balls.

3. A linear motion guide unit comprising:

an elongated rail, including first guiding means extending in parallel with a longitudinal axis of said rail to thereby define a first path of motion and second guiding means extending in parallel with the longitudinal axis of said rail to thereby define a second path of motion separate from said first path of motion;

at least one first slider slidably mounted on said rail to travel along said first path, said first slider including third guiding means associated with said first guiding means to thereby define a first guide channel;

a plurality of first rolling members provided in said first guide channel to thereby provide a rolling contact between said rail and said first slider;

at least one second slider slidably mounted on said rail to travel along said second path, said second slider including fourth guiding means associated with said second guiding means to thereby define a second guide channel;

a plurality of second rolling members provided in said second guide channel to thereby provide a rolling contact between said rail and said second slider;

wherein at least one of said first and second sliders includes at least one endless circulating path which includes a load path section, a return path section and a pair of curved connecting path sections, each connecting corresponding ends of said load and return path sections, whereby said load path section corresponds to a corresponding one of said guide channels; and wherein said rail has a generally U-shaped cross section, including a horizontal section and a pair of vertical section depending from the opposite sides of said horizontal section.

4. The guide unit of claim 3, wherein said first slider also has a generally U-shaped cross section, including a horizontal section and a pair of vertical sections depending from the opposite sides of said horizontal section, and said first slider is slidably mounted on said rail on a straddling manner.

5. The guide unit of claim 4, wherein said second slider is located generally located inside a space defined by the generally U-shaped cross section of said rail.

6. The guide unit of claim 5, wherein said second slider has a generally rectangular cross section.

7. The guide unit of claim 3, wherein said first guiding means includes a pair of guide grooves formed in a pair of outer side surfaces of said rail, respectively, at a location such that said horizontal section is sandwiched between said pair of guide grooves.

* * * * *